United States Patent
Sodagar

(10) Patent No.: US 12,537,968 B2
(45) Date of Patent: Jan. 27, 2026

(54) METHOD FOR EMBEDDING THE HAPTICS EFFECTS SEMANTIC IN HAPTICS STREAMING

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/636,607

(22) Filed: Apr. 16, 2024

(65) Prior Publication Data

US 2024/0348812 A1 Oct. 17, 2024

Related U.S. Application Data

(60) Provisional application No. 63/459,945, filed on Apr. 17, 2023, provisional application No. 63/459,947, filed on Apr. 17, 2023.

(51) Int. Cl.
*H04N 19/44* (2014.01)
*H04N 19/136* (2014.01)
*H04N 19/70* (2014.01)

(52) U.S. Cl.
CPC ........... *H04N 19/44* (2014.11); *H04N 19/136* (2014.11); *H04N 19/70* (2014.11)

(58) Field of Classification Search
CPC ....... H04N 19/136; H04N 19/44; H04N 19/70
See application file for complete search history.

(56) References Cited

U.S. PATENT DOCUMENTS

| | | |
|---|---|---|
| 2016/0231816 A1 | 8/2016 | Rank et al. |
| 2018/0343075 A1 | 11/2018 | Heubel et al. |
| 2019/0019340 A1* | 1/2019 | Yun .................. G06T 19/006 |
| 2019/0080570 A1 | 3/2019 | Levesque et al. |
| 2019/0230388 A1* | 7/2019 | Di .................... H04N 21/2662 |
| 2019/0325652 A1* | 10/2019 | Di ...................... H04N 19/33 |

(Continued)

FOREIGN PATENT DOCUMENTS

| | | | | |
|---|---|---|---|---|
| WO | WO-2024086230 A1 * | 4/2024 | ....... | H04N 21/23614 |
| WO | WO-2024188602 A1 * | 9/2024 | ........... | A63F 13/285 |

OTHER PUBLICATIONS

"MPEG 3D Graphics and Haptics Coding"—ISO/IEC JTC 1/SC 29/WG 7; Oct. 27, 2022 (Year: 2022).*

(Continued)

*Primary Examiner* — Mainul Hasan
(74) *Attorney, Agent, or Firm* — Sughrue Mion, PLLC

(57) ABSTRACT

Method, apparatus, and system for haptic signal processing are provided. The process may include receiving a media stream comprising at least one haptic track and at least one video track. The process may include receiving a media stream, in a case that the data is in the haptics interchange format, obtaining a first syntax, from the media stream, and determining, from the first syntax, a scheme used for a semantic description of effects of the media stream, in a case that the data is in the haptics streaming format, obtaining a second syntax, from the media stream, and determining, from the second syntax, the scheme used for a semantic description of effects of the media stream and a number of characters in the scheme, and controlling decoding of the media stream based determining the scheme.

18 Claims, 11 Drawing Sheets

(56) References Cited

U.S. PATENT DOCUMENTS

2021/0044644 A1    2/2021  Wu et al.
2023/0290234 A1*   9/2023  Wei ......................... G08B 6/00

OTHER PUBLICATIONS

"Construction of a haptic-enabled broadcasting system based on the MPEG-V standard"—Kim et al., Signal Processing: Image Communication 28 (2013)151-161 (Year: 2013).*

MPEG 3D Graphics and Haptics Coding, "Text for Committee Draft of ISO/IEC 23090-31: Haptics Coding", International Organization for Standardization Organisation Internationale De Normalisation, ISO/IEC JTC 1/SC 29/WG 7, N449, Oct. 2022, Mainz, pp. 1-109 (117 pages total).

International Search Report (PCT/ISA/210) dated Jul. 8, 2024 issued by the International Searching Authority in International Application No. PCT/US2024/024949.

Written Opinion (PCT/ISA/237) dated Jul. 8, 2024 issued by the International Searching Authority in International Application No. PCT/US2024/024949.

* cited by examiner

METHOD FOR EMBEDDING THE HAPTICS EFFECTS SEMANTIC IN HAPTICS STREAMING

CROSS-REFERENCE TO RELATED APPLICATIONS

This application claims priority from both U.S. Provisional Application No. 63/459,947, filed on Apr. 17, 2023, and also U.S. Provisional Application No. 63/459,945, also filed on Apr. 17, 2023, the disclosures of which are incorporated herein by reference in their entireties.

FIELD

This disclosure is directed to a set of advanced video coding technologies. More specifically, the present disclosure is directed to encoding and decoding haptic experience for multimedia presentation and a method for the carriage of binary wavelet streams in haptics interchange format.

BACKGROUND

Haptics experience has become a part of multimedia presentation. In applications where multimedia presentation includes an aspect of haptic experience, haptic signals may be delivered to the device or wearable and the user may feel the haptic sensations during the use of the application in coordination with the visual and/or audio media experience.

Recognizing the growing popularity of haptic experience in multimedia presentations, motion picture experts group (MPEG) has started working on a compression standard (both for MPEG-DASH and MPEG-I) for haptics as well as carriage of the compressed haptics signaling in ISO based media file format (ISOBMFF).

One of the problems to be solved in involving an aspect of haptic experience within a multimedia presentation is that the timing model of the carriage of haptics tracks is not clear, i.e. it is not clear how the timing of the ISOBMFF tracks relates to the timing of the haptic elementary signal. Solutions addressing this problem are required.

As the haptic Committee Draft includes one JSON and one binary format. Recently there have been discussions to add a semantic description of the effects in these two formats. However, a semantic dictionary has not been added to the standard, and a flexible way of signaling different or extending the semantic dictionaries is not yet supported. And while adding the semantics may be easy in interchange format, how a number of keywords are added in the binary format is a challenge to maintain compactness while allowing flexibility. Solutions addressing these problems are required.

SUMMARY

According to an aspect of the disclosure, there is an apparatus, and similarly a method and computer readable medium, including at least one memory configured to store computer program code; and at least one processor configured to access the computer program code and operate as instructed by the computer program code, the computer program code including: receiving code configured to cause the at least one processor to receive a media stream comprising data in one of a haptics interchange format and a haptics streaming format; obtaining code configured to cause the at least one processor to: in a case that the data is in the haptics interchange format, obtain a first syntax, from the media stream, and determining, from the first syntax, a scheme used for a semantic description of effects of the media stream; and in a case that the data is in the haptics streaming format, obtain a second syntax, from the media stream, and determining, from the second syntax, the scheme used for a semantic description of effects of the media stream and a number of characters in the scheme; and controlling code configured to cause the at least one processor to control decoding of the media stream based determining the scheme.

The first syntax may indicate "MPEG_haptics.perception object".

In the case that the data is in the haptics interchange format, the scheme may be indicated in "MPEG_haptics.perception object" by an "effect_semantic" syntax.

The second syntax may indicate "readMetadataPerception( )".

In the case that the data is in the haptics streaming format, the scheme may be indicated in "readMetadataPerception( )" by an "effectSemantic" syntax, and the number of characters in the scheme is indicated in "readMetadataPerception( )" by a "schemeLength" syntax.

The "readMetadataPerception( )" may further indicate that at least one character in an effect semantic scheme identifier is in the form of a uniform resource name (URN).

In the case that the data is in the haptics streaming format, the media stream may indicate whether an effect has any semantic keyword and indicates how many keywords are included in the effect.

In the case that the data is in the haptics streaming format, the media stream may indicate whether the effect has any semantic keyword by a "hasSemantics" flag.

In the case that the data is in the haptics streaming format, the media stream may indicate how many keywords are included in the effect by a "semanticNumber" flag.

In the case that the data is in the haptics streaming format, the media stream may further indicate, by an "effectSemantic" flag, a semantic keyword code according to a semantic code table.

Additional embodiments will be set forth in the description that follows and, in part, will be apparent from the description, and/or may be learned by practice of the presented embodiments of the disclosure.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

According to an aspect of the present disclosure, methods, systems, and non-transitory storage mediums for parallel processing of dynamic mesh compression are provided. Embodiments of the present disclosure may also be applied to static meshes.

Figure 1:
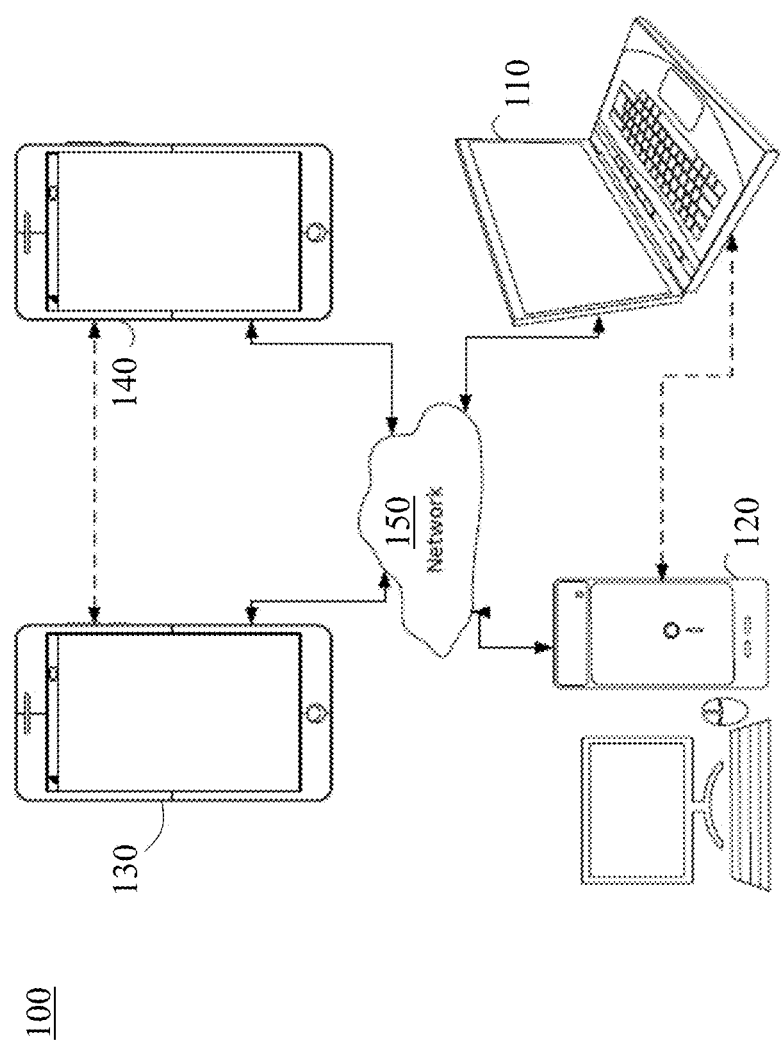
FIG. 1 is a schematic illustration of a simplified block diagram of a communication system, in accordance with embodiments of the present disclosure.
Figure 2:
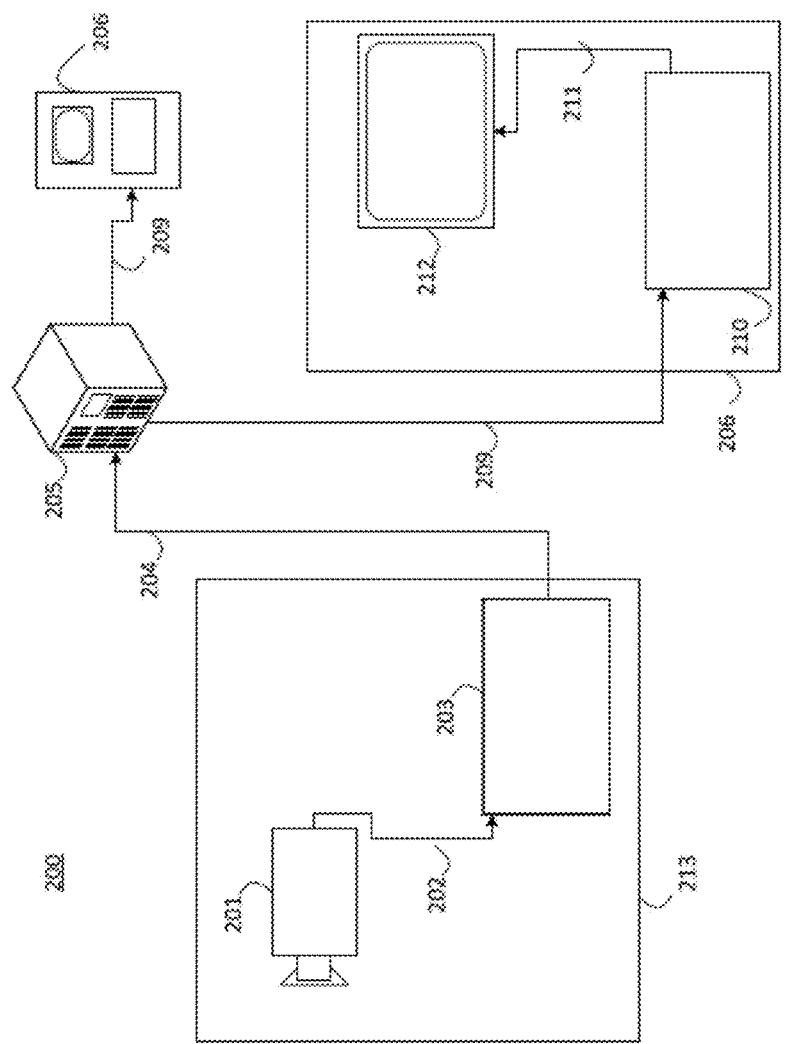
FIG. 2 is a schematic illustration of a simplified block diagram of a streaming system, in accordance with embodiments of the present disclosure.

With reference to FIG. 1 and FIG. 2, an embodiment of the present disclosure for implementing encoding and decoding structures of the present disclosure are described.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data, which may include mesh data, at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminals. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

FIG. 2 illustrates, as an example of an application for the disclosed subject matter, a placement of a video encoder and decoder in a streaming environment. The disclosed subject matter can be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 can create, for example, a stream 202 that includes a 3D mesh and metadata associated with the 3D mesh. The video source 201 may include, for example, 3D sensors (e.g. depth sensors) or 3D imaging technology (e.g. digital camera(s)), and a computing device that is configured to generate the 3D mesh using the data received from the 3D sensors or the 3D imaging technology. The sample stream 202, which may have a high data volume when compared to encoded video bitstreams, can be processed by the encoder 203 coupled to the video source 201. The encoder 203 can include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, can be stored on a streaming server 205 for future use. One or more streaming clients 206 can access the streaming server 205 to retrieve video bit streams 209 that may be copies of the encoded video bitstream 204.

The streaming clients 206 can include a video decoder 210 and a display 212. The video decoder 210 can, for example, decode video bitstream 209, which is an incoming copy of the encoded video bitstream 204, and create an outgoing video sample stream 211 that can be rendered on the display 212 or another rendering device (not depicted). In some streaming systems, the video bitstreams 204, 209 can be encoded according to certain video coding/compression standards.

Figure 3:
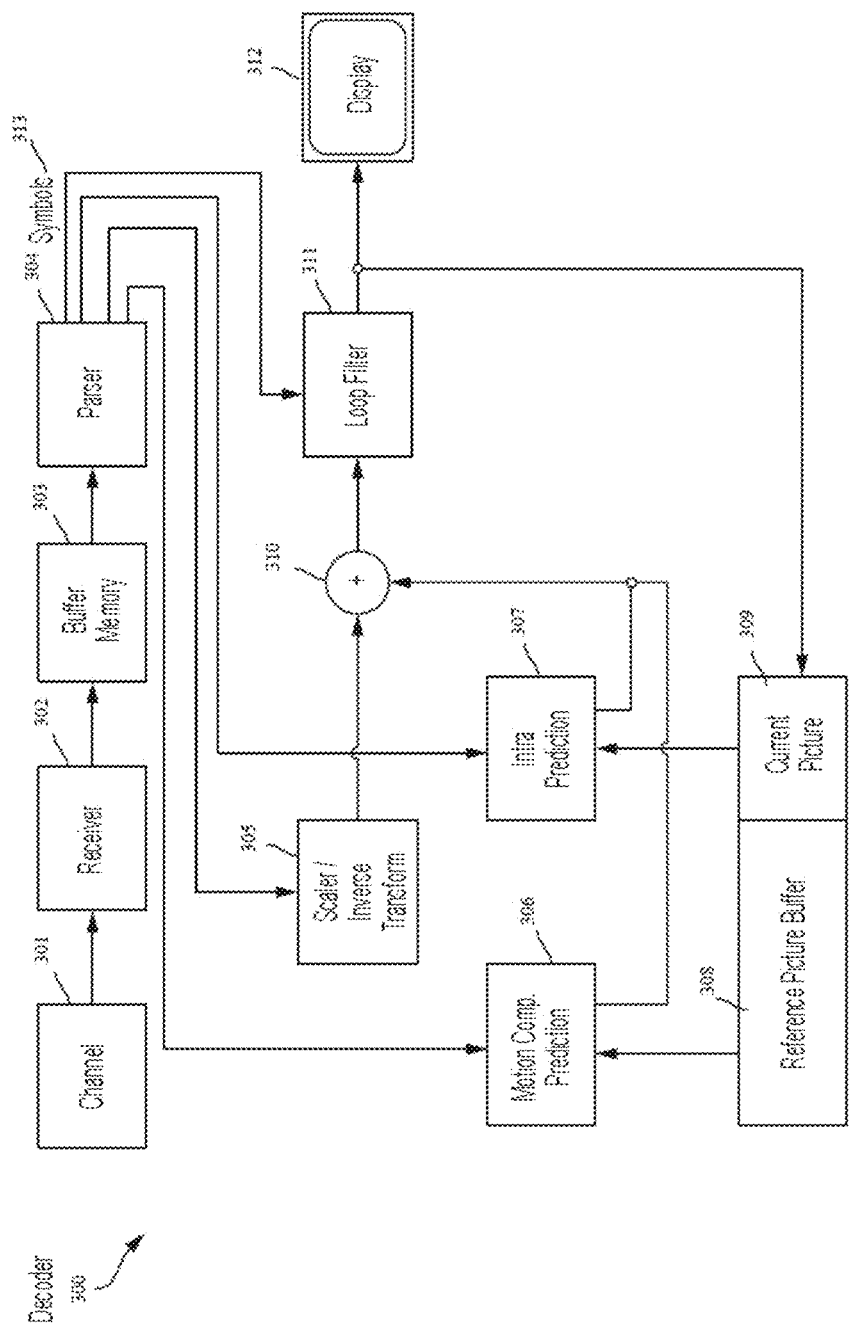
FIG. 3 is an example illustration in accordance with embodiments of the present disclosure.

FIG. 3 may be a functional block diagram of a video decoder 300 according to an embodiment of the present invention.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities (not depicted). The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosynchronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information parameter set fragments (not depicted). The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 300 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the render device 312 as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 4:
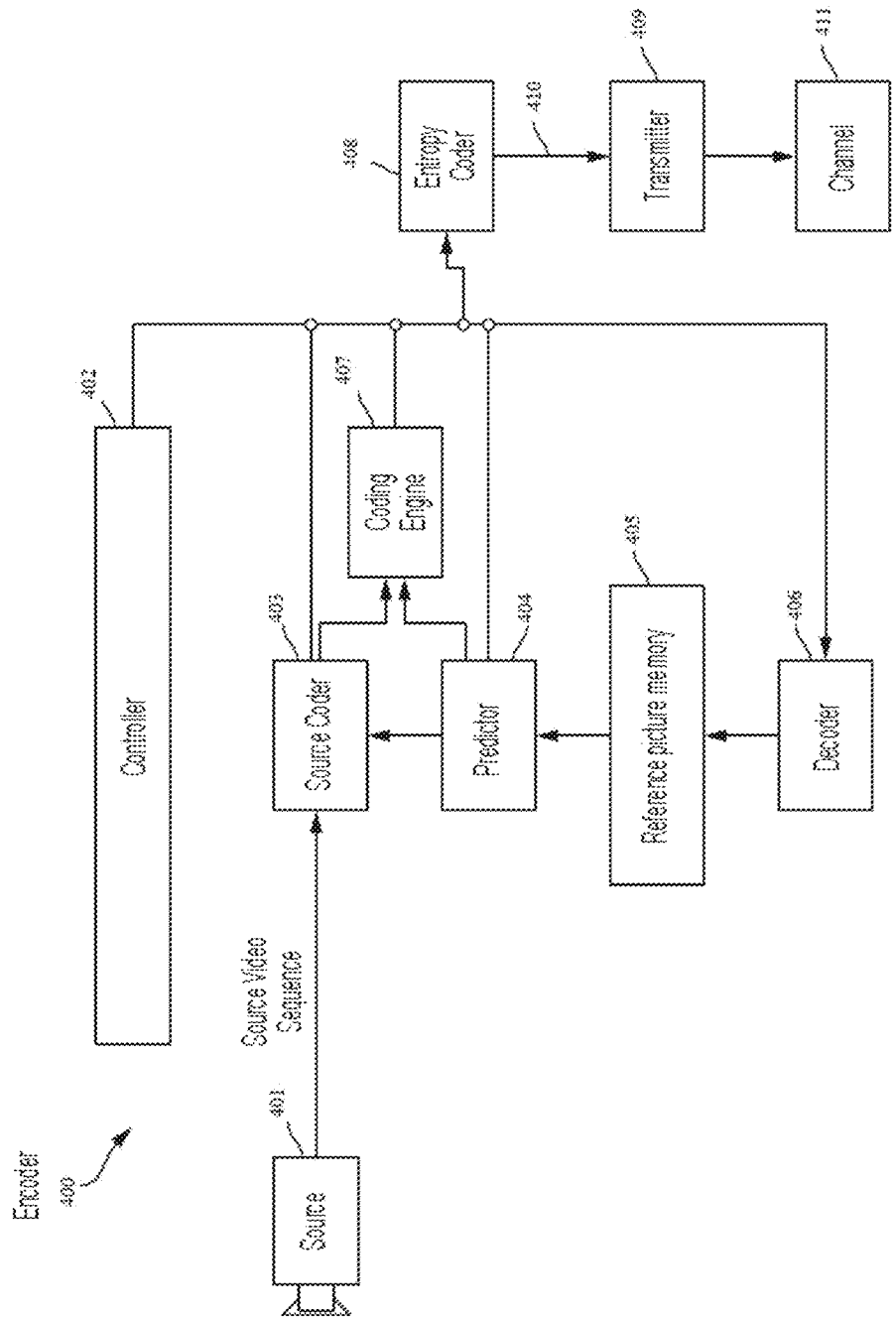
FIG. 4 is an example illustration in accordance with embodiments of the present disclosure.

FIG. 4 may be a functional block diagram of a video encoder 400 according to an embodiment of the present disclosure.

The encoder 400 may receive video samples from a video source 401 (that is not part of the encoder) that may capture video image(s) to be coded by the encoder 400.

The video source 401 may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 401 may be a storage device storing previously prepared video. In a videoconferencing system, the video source 401 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 400 may code and compress the pictures of the source video sequence into a coded video sequence 410 in real time or under any other time constraints as required by the application. Enforcing appropriate coding speed is one function of Controller 402. Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 402 as they may pertain to video encoder 400 optimized for a certain system design.

Some video encoders operate in what a person skilled in the art readily recognizes as a "coding loop." As an oversimplified description, a coding loop can consist of the encoding part of an encoder 402 ("source coder" henceforth) (responsible for creating symbols based on an input picture to be coded, and a reference picture(s)), and a (local) decoder 406 embedded in the encoder 400 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 405. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 406 can be the same as of a "remote" decoder 300, which has already been described in detail above in conjunction with FIG. 3. Briefly referring also to FIG. 4, however, as symbols are available and en/decoding of symbols to a coded video sequence by entropy coder 408 and parser 304 can be lossless, the entropy decoding parts of decoder 300, including channel 301, receiver 302, buffer 303, and parser 304 may not be fully implemented in local decoder 406.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 403 may perform motion compensated predictive coding, which codes an input frame predictively with reference to one or more previously-coded frames from the video sequence that were designated as "reference frames." In this manner, the coding engine 407 codes differences between pixel blocks of an input frame and pixel blocks of reference frame(s) that may be selected as prediction reference(s) to the input frame.

The local video decoder 406 may decode coded video data of frames that may be designated as reference frames, based on symbols created by the source coder 403. Operations of the coding engine 407 may advantageously be lossy processes. When the coded video data may be decoded at a video decoder (not shown in FIG. 4), the reconstructed video sequence typically may be a replica of the source video sequence with some errors. The local video decoder 406 replicates decoding processes that may be performed by the video decoder on reference frames and may cause reconstructed reference frames to be stored in the reference picture cache 405. In this manner, the encoder 400 may store copies of reconstructed reference frames locally that have common content as the reconstructed reference frames that will be obtained by a far-end video decoder (absent transmission errors).

The predictor 404 may perform prediction searches for the coding engine 407. That is, for a new frame to be coded, the predictor 404 may search the reference picture memory 405 for sample data (as candidate reference pixel blocks) or certain metadata such as reference picture motion vectors, block shapes, and so on, that may serve as an appropriate prediction reference for the new pictures. The predictor 404 may operate on a sample block-by-pixel block basis to find appropriate prediction references. In some cases, as determined by search results obtained by the predictor 404, an input picture may have prediction references drawn from multiple reference pictures stored in the reference picture memory 405.

The controller 402 may manage coding operations of the video coder 403, including, for example, setting of parameters and subgroup parameters used for encoding the video data.

Output of all aforementioned functional units may be subjected to entropy coding in the entropy coder 408. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 409 may buffer the coded video sequence(s) as created by the entropy coder 408 to prepare it for transmission via a communication channel 411, which may be a hardware/software link to a storage device which would store the encoded video data. The transmitter 409 may merge coded video data from the video coder 403 with other data to be transmitted, for example, coded audio data and/or ancillary data streams (sources not shown).

The controller 402 may manage operation of the encoder 400. During coding, the controller 405 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 400 may perform coding operations according to a predetermined video coding technology or standard, such as ITU-T Rec. H.265. In its operation, the video coder 400 may perform various compression operations, including predictive coding operations that exploit temporal and spatial redundancies in the input video sequence. The coded video data, therefore, may conform to a syntax specified by the video coding technology or standard being used.

In an embodiment, the transmitter 409 may transmit additional data with the encoded video. The source coder 403 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 5A:
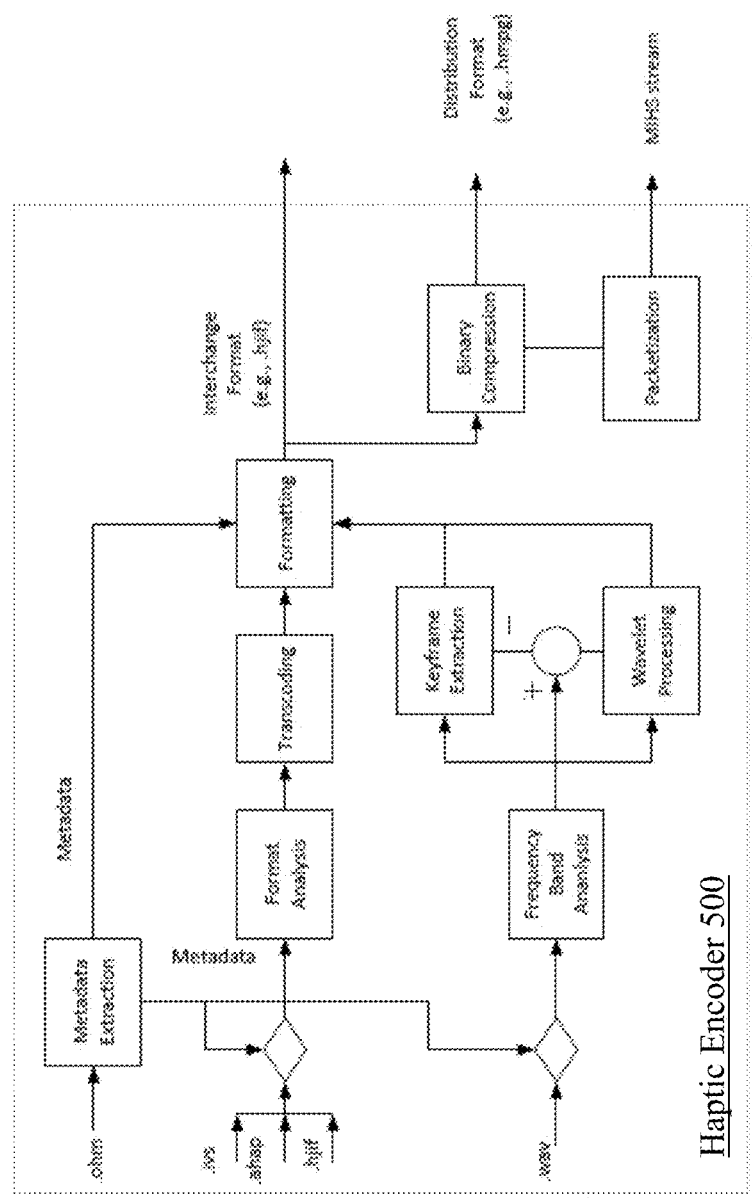
FIG. 5A is an example illustration in accordance with embodiments of the present disclosure.
Figure 5B:
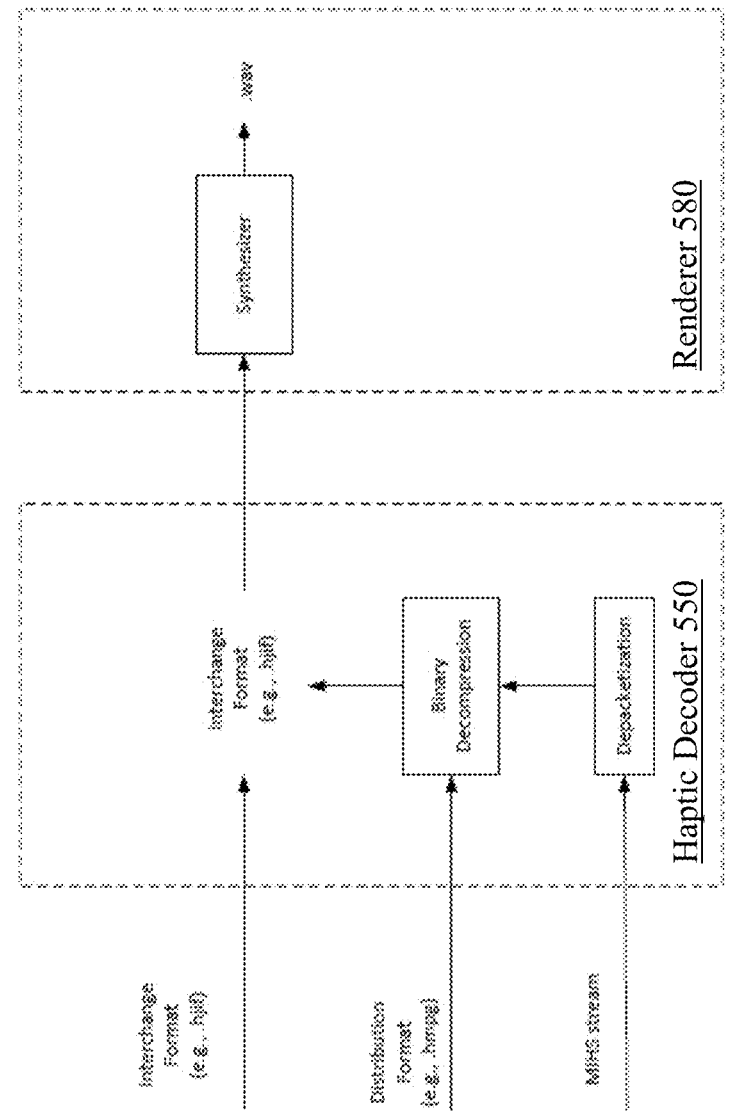
FIG. 5B is an example illustration in accordance with embodiments of the present disclosure.

With reference to FIGS. 5A-B, an embodiment of the present disclosure for implementing haptic encoder 500 and haptic decoder 550 are described.

As shown in FIG. 5A, the haptic encoder 500 may receive both descriptive and waveform haptic data. Thus, the haptic encoder 500 may be able to process three types of input files: .ohm metadata files (Object Haptic Metadata—Text file format for haptics metadata), descriptive haptics files (.ivs, .ahap, and .hjif) or waveform PCM files (.wav). An example of descriptive data may include .ahap (Apple Haptic and Audio Pattern—JSON-like file format that specifies a haptic pattern) from Apple (representing the expected haptic output by a set of modulated continuous signals and a set of modulated transients parametrized), .ivs from Immersion (representing the expected haptic output by a set of basis effects parametrized by a set of parameters), or .hjif (Haptics JSON Interchange Format) the proposed MPEG format. An example of the waveform pulse-code modulation (PCM) signals may include .ohm input files that include metadata information.

According to an embodiment, the haptic encoder 500 may process the two types of input files differently. For descriptive content, the haptic encoder 500 may analyze the input semantically to transcode (if necessary) the data into the proposed coded representation.

According to an embodiment, the .ohm metadata input file may include a description of the haptic system and setup. In particular, it may include the name of each associated haptic file (either descriptive or PCM) along with a description of the signals. It also provides a mapping between each channel of the signals and the targeted body parts on the user's body. For the .ohm metadata input file, the haptic encoder performs metadata extraction by retrieving the associated haptic files from the URI and encodes it based on its type and by extracting the metadata from the .ohm file and maps it to metadata information of the data model.

According to an embodiment, descriptive haptics files (e.g., .ivs, .ahap, and .hjif) may be encoded through a simple process. The haptic encoder 500 first identifies specifically the input format. If the input format is a .hjif file, then no transcoding is necessary, the file can be further edited, compressed into the binary format and eventually packetized into an MIHS stream. If .ahap or .ivs input files are used, a transcoding is necessary. The haptic encoder 500 first analyses the input file information semantically and transcodes it to be formatted into a selected data model. After transcoding, the data can be exported as the .hjif file, a .hmpg binary file or an MIHS stream.

According to an embodiment, the haptic encoder 500 may perform signal analysis to interpret the signal structure of the .wav files and convert it into the proposed encoded representation. For waveform PCM content, the signal analysis process may be split into two sub-processes by the haptic encoder 500. After performing a frequency band decomposition on the signal, at a first sub-process, low frequencies may be encoded using a keyframe extraction process. The low frequency band(s) may then be reconstructed and the error between this signal and the original low frequency signal may be computed. This residual signal may then be added to the original high frequency band(s), before encoding using Wavelet Transforms, the encoding using Wavelet Transforms being the second sub-process. According to an embodiment, when several low frequency bands are used, the residual errors from all the low frequency bands are added to the high frequency band before encoding. In embodiment when several high frequency bands are used, the residual errors from the low frequency band(s) are added to the first high frequency band before encoding.

According to an embodiment, keyframe extraction includes taking the lower frequency band from the frequency band decomposition and analyzing its content in the time domain. According to an embodiment, wavelet processing may include taking the high frequency band from the frequency band decomposition and the low frequency residual, and splitting it into blocks of equal size. These signal blocks of equal size are then analyzed in a psycho-haptic model. The lossy compression may be applied by wavelet transforming the block and quantizing it, aided by the psychohaptic model. In the end, each block is then saved into a separate effect in a single band, which is done in the formatting. The binary compression may apply lossless compression using the appropriate coding techniques, e.g., the Set partitioning in hierarchical trees (SPIHT) algorithm and Arithmetic Coding (AC).

As shown in FIG. 5A, the haptic encoder 500 may be configured to encode descriptive and quantized haptic data and may output three types of formats—an interchange format (.hjif), a binary compressed format (.hmpg), and a streaming format (e.g., MPEG immersive haptic stream (MIHS)). The .hjif format is a human-readable format based on JSON and can easily be parsed and manually edited which makes it an ideal interchange format, especially when designing/creating content. For distribution purposes, the .hjif data can be compressed into a more memory efficient binary .hmpg bitstream. This compression may be lossy, with different parameters impacting the encoding depth of amplitude and frequencies composing the bitstream. For streaming purposes, the data can be compressed and packetized into a MPEG-I haptic stream (MIHS). The above-mentioned three formats have complementary purposes and a lossy one-to-one conversion may be operated between them.

As shown in FIG. 5B, the haptic decoder 550 may take as input either a .hmpg compressed binary file format or an MIHS bitstream. the haptic decoder 550 may output a .hjif interchange format that can be used directly for rendering. The two input formats may go through a binary decompression to extract both the metadata and the data itself from the file and map it to the selected data structure. Then, the data can be exported in the .hjif format to the haptic renderer 580.

As shown in FIG. 5B, the renderer 580 comprises a synthesizer. The synthesizer may render haptic data from a .hjif input file into a PCM output file. The rendering and/or synthesizing is informative. According to an embodiment, the synthesizer parses the input files and performs the high-level synthesis distribution between vectorial, wavelets, etc. The synthesis process then goes down to the Band component of the codec in which a synthesis process is called. Then all the bands of a given channel are mixed by a simple addition operator to recreate the desired haptic signal.

According to embodiments, the haptic experience defines the root of the hierarchical data model. It provides information on the date of the file and the version of the format, it describes the haptic experience, it lists the different avatars (i.e., body representation) used throughout the experience and it defines all the haptic perceptions.

According to an embodiment, a self-contained stream format to transport MPEG-I haptic data may use a packetized approach and may include two levels of packetization: MPEG-I haptic stream (MIHS) unit which covers a duration of time and includes zero or more MIHS packets and MIHS packet which includes metadata or haptic effect data. In embodiments, the MIHS unit may be referred to as a network abstraction layer unit associated with the haptic data. In embodiments, the MIHS unit may be referred to as a MIHS sample associated with the haptic data.

According to an embodiment, a MIHS unit may be a sync unit or a non-sync unit. A sync unit resets the previous effects and therefore provides an independent haptic experience from the previous MIHS units. A non-sync unit is the continuation of previous MIHS units and cannot be independently decoded and rendered without decoding the previous MIHS unit(s).

According to embodiments, haptic signals may be encoded on multiple channels. In some embodiments, a haptic channel may define a signal to be rendered at a specific body location with a dedicated actuator/device. Metadata stored at the channel level may include information such as the gain associated to the channel, the mixing weight, the desired body location of the haptic feedback and optionally the reference device and/or a direction. Additional information such as the desired sampling frequency or sample count may also be provided. Finally, the haptic data of a channel is contained in a set of haptic bands defined by their frequency range. A haptic band describes the haptic signal of a channel in a given frequency range. Bands are defined by a type and a sequential list of haptic effects each containing a set of keyframes. For every type of haptic band, haptic effects may be defined with at least a position and a type. The position may indicate the temporal or spatial position of the effect. In some embodiments, value 0 is the relative starting position of the experience depending on the perception modality's dependent variable configured. The default unit for temporal haptic feedback may be milliseconds while it may be millimeters for spatial haptic feedback. The present embodiment discloses "starting position of the experience" because the binary distribution format does not have any concept of limited time interval, i.e. frames or samples.

Depending on the type of band and the type of effect, additional properties may be specified, including the phase, the base signal, a composition and a number of consecutive haptic keyframes describing the effect.

According to an embodiment, the haptic data hierarchy is defined in the present disclosure.

Haptic Channels
  Haptic Bands
    Haptic Effects

Embodiments of the present disclosure describe two anchors for the haptic effect's position relative to the ISOBMFF track.

Figure 6:
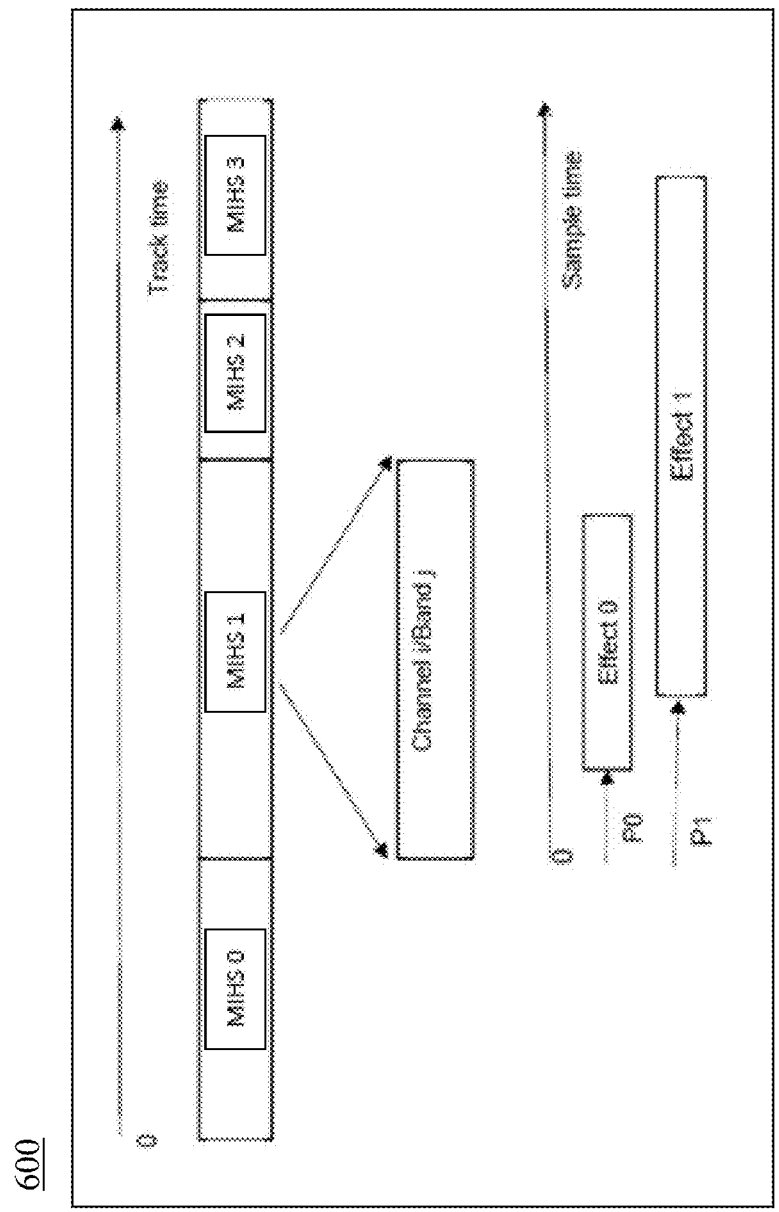
FIG. 6 is an exemplary flow diagram illustrating a process for processing haptic media in accordance with embodiments of the present disclosure.

A first embodiment 600 is shown in FIG. 6. As shown in FIG. 6, each MIHS unit (also referred to as MIHS samples, ISOBMFF haptic sample, or sample in embodiments) includes one or more haptic channel information and one or more haptic band information. As stated above, each MIHS unit consists of one or more channels and each channel consists of one or more bands. Then each band may have one or more effects.

In a first embodiment, an effect's temporal position may be defined as an offset to the sample's start timing (e.g., MIHS unit start time) carrying that effect. In ta second or same embodiment, the offset is based from the media or haptic track's start time and/or presentation time.

According to embodiments, the first embodiment enables manipulating of the track with no impact on the haptic effect's positions because any changes in the ISOBMFF sample timing would not impact the effect's relative positions. According to embodiments, in the case of elementary haptic streams (e.g., high-level syntax streams), when the elementary stream is used without ISOBMFF, the second embodiment may be used.

Figure 7:
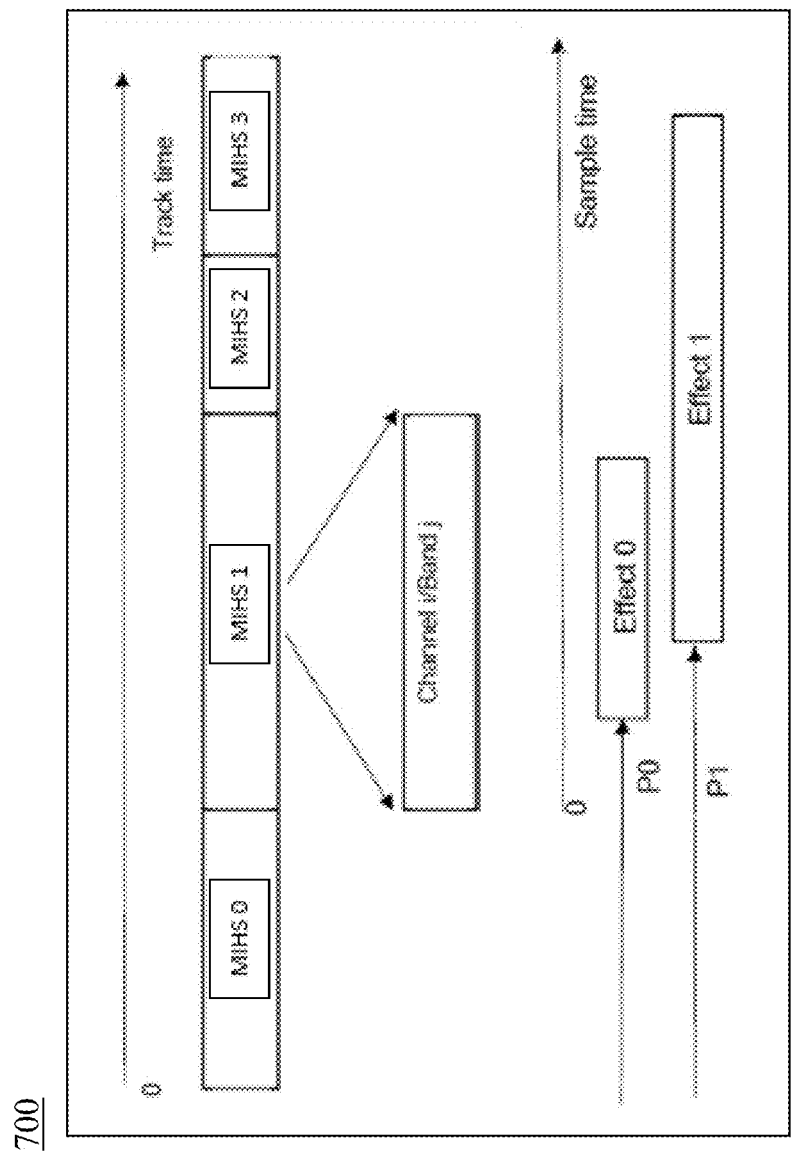
FIG. 7 is an exemplary diagram illustrating aspects in accordance with embodiments of the present disclosure.

According to embodiments, several types of haptic tracks may be used, In an embodiment, samples or MIHS units having an effect's temporal position defined as an offset to the sample's start timing may be used in the haptic track. According to another embodiment, such as example 700 in FIG. 7, samples or MIHS units having their effect's temporal positions are relative to the start time of the track are used in the haptic track. In another embodiment, mixed MIHS units or samples may be used.

Embodiments of the present disclosure provide timing models that may be used to synchronize haptic effects with other media tracks in the same or related ISOBMFF files. With the timing model for the haptic track being relative to the timing model of the related ISOBMFF files, manipulation and processing of the media tracks becomes more efficient.

Figure 8:
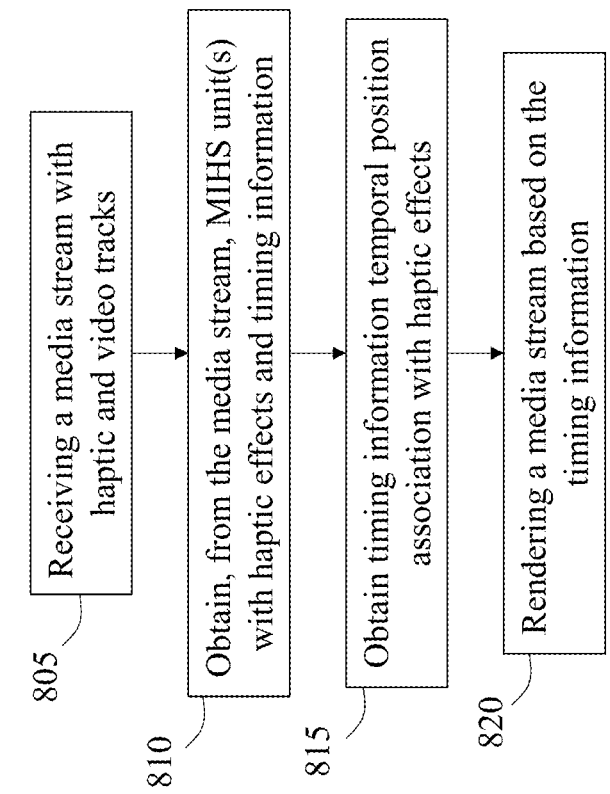
FIG. 8 is an exemplary diagram illustrating aspects in accordance with embodiments of the present disclosure.

As shown in FIG. 8, process 800 illustrates an exemplary process for decoding haptic data.

At operation 805, a media stream including one or more haptic tracks and one or more video tracks may be received.

At operation 810, one or more moving picture experts group (MPEG) immersive haptics stream (MIHS) units may be obtained from the media stream. In some embodiments, the MIHS unit may include one or more haptic effects. The MIHS unit may also include a start time of the MIHS unit.

In embodiments, the MIHS unit is associated with at least one haptic channel, the at least one haptic channel comprises one or more haptic bands, and each of the one or more haptic bands has at least one haptic effect.

At operation 815, timing information associated with the one or more haptic effects may be obtained. In embodiments, the timing information may include at least one temporal position of the one or more haptic effects.

In embodiments, a temporal position of a haptic effect indicates an effect start time for the haptic effect, with the effect start time for the haptic effect being an offset based on the start time of a respective MIHS unit. The effect start time may indicate a start time of the haptic effect relative to the start time of the respective MIHS unit.

In embodiments, the effect start time for the haptic effect is an absolute time based on the start time of the at least one haptic track or the at least one video track.

At operation 820, the media stream is rendered based on the obtained timing information.

According to an embodiment, a manipulation of an order of the one or more MIHS units does not affect the at least one temporal position of the one or more haptic effects because the one or more MIHS units correspond to one or more ISO based media file format (ISOBMFF) samples associated with the at least one video track.

In some embodiments, a sync MIHS unit may be obtained from the media stream. In embodiments, the sync MIHS unit is a special type of MIHS unit configured to provide a reset point in the bitstream. In embodiments, the sync MIHS unit is mapped to a sync sample in a video bitstream corresponding to the one or more haptic channels.

Figure 9:
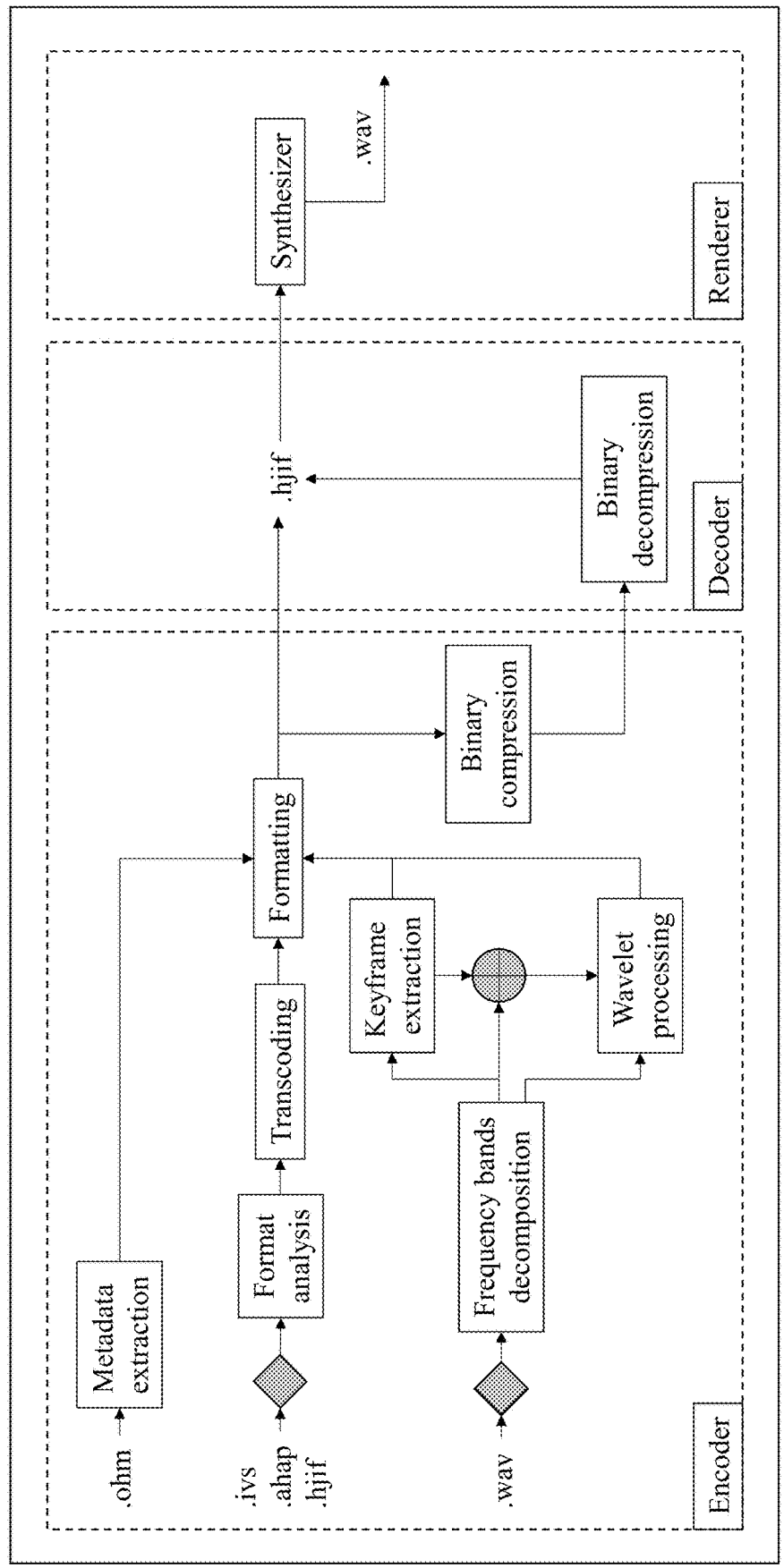
FIG. 9 is an exemplary diagram illustrating aspects in accordance with embodiments of the present disclosure.

As in the example 900 of FIG. 9, a haptic encoder, according to embodiments herein, generates a binary distribution format (.hmpg) which is compact and efficient for distribution. The haptic decoder can decode such a format and send it to the renderer.

The ISOBMFF haptic binding Working draft defines the following for the haptics samples in ISOBMFF track:

```
aligned(8) class MIHSSample {
    for (int i=0; i<sample_size; i++) { // to end of sample
        unsigned int(4) data_packet_type = 5;
        unsigned int(2) data_packet_level;
        unsigned int(10) reserved = 0;
        unsigned int(16) data_packet_payload_size;
        bit(data_packet_payload_size*8) data_packet_payload;
```

-continued

```
        i +=4 + data_packet_payload_size;
    }
}
```

As indicated above, the data_packet_type is set to a fixed value.

The ISOBMFF haptic sample according to embodiments herein may have the following data packets:
1. A silent packet with not data, i.e. zero data packets.
2. One or more temporal data packets.
3. One or more spatial data packets.
4. A combination of 2 and 3
5. A possible combination of 2 and 3, without any promise, i.e zero or more temporal and/or data packets.

Embodiments herein may use the data_packet_type to signal the above conditions, such that data_packet_type, i.e. $b_3b_2b_1b_1$, may be signaled as follows:

TABLE 1

| | data packet/sample type |
|---|---|
| i | Type |
| 0 | Nonsilent, i.e. at least one data packet with temporal and/or spatial data |
| 1 | One or more temporal effects |
| 2 | One or more spatial effects |
| 3 | Reserved | where, according to embodiments, data_packet_type=0 indicates that this sample is a silent sample, i.e. equivalent of one or multiple consecutive MIHS silent unit.

Therefore, the following values, of Table 2, for data_packet_type have the following meanings:

TABLE 2

| data_packet_type | meaning |
|---|---|
| 0 | Silent sample, no data packet in this sample |
| 1 | The sample may have one data packet, i.e. it is a non-silent sample. |
| 2 | The sample has one or more temporal effect data packets. |
| 3 | The sample has one or more temporal effect data packets. |
| 4 | The sample has one or more spatial effect data packets. |
| 5 | The sample has one or more spatial effect data packets. |
| 6 | The sample has one or more temporal and one or more spatial effect data packets. |
| 7 | The sample has one or more temporal and one or more spatial effect data packets. |
| 8-15 | Reserved |

And, according to embodiments, the file format parser can use the data_packet_type in the following manners:
1. Identify the silent samples and skip further parsing them when processing the file, therefore faster random access and fast forward/rewind navigation through the file.
2. Identify which samples have only temporal data packets, for extraction of the temporal effects.
3. identify which samples have only spatial data packets, for extraction of spatial effects.
4. When decomposing a track to multi-tracks, separate the temporal and spatial samples more easily.

5. When combining multiple tracks into a single track, decide on the sample structure of the new tracks and whether samples shall combine the temporal and spatial packets or maintain them in separate samples.

As such, there is, according to embodiments, a method for signaling the sample type in ISOBMFF haptic samples, where the sample is identified as a silent sample, a nonsilent sample, a nonsilent sample with temporal effects only, a nonsilent sample with spatial effects only, a nonsilent sample that has a combination on temporal and spatial effects wherein the signaling is achieved using a bit-based flag for different features, wherein a file format parse can take advantage of the information provided by the sample type and navigate through the file faster, due to skipping silent samples, or using the sample type information to extract spatial only, temporal only or silent only information, or to use the information for bitstream manipulation, single track to multitrack conversion and vice versa.

As in the example 900 of FIG. 9, a haptic encoder, according to embodiments herein, generates a binary distribution format (.hmpg) which is compact and efficient for distribution. The haptic decoder can decode such a format and send it to the renderer. But, without embodiments herein, haptics interchange format (.hjif) in the other hand, doesn't have binary compression, and so, the wavelet coefficients are stored in .hjif and not the compressed bitstream. And in that light, embodiments herein expand the band type in the .hjif format to include a new option: binary wavelet, also according to embodiments.

As the haptic Committee Draft includes one JSON and one binary format. Recently there have been discussions to add a semantic description of the effects in these two formats. However, a semantic dictionary has not been added to the standard, and a flexible way of signaling different or extending the semantic dictionaries is not yet supported. Solutions addressing these problems are required.

In that light, embodiments herein add a scheme identifier to HJIF. For example, see Table 3 below providing a description of the MPEG_haptics.perception object:

TABLE 3

Description of the MPEG_haptics.perception object

| Property | Type | Default | Description | Required |
| --- | --- | --- | --- | --- |
| id | integer | N/A | Unique ID of the perception. The value must be greater or equal to 0. | Yes |
| perception_modality | enum <string> | N/A | Indicates the type of perception as defined in a subclause. Possible values are: "Pressure" "Acceleration" "Velocity" "Position" "Temperature" "Vibrotactile" "Water" "Wind" "Force" "Electrotactile" "Vibrotactile Texture" "Stiffness" "Friction" "Humidity" "User-defined Spatial" "Other" | Yes |
| description | String | N/A | The user-defined description of the haptic perception. | Yes |
| avatar_id | number | N/A | Unique ID of the associated avatar body model from a subclause. | Yes |
| effect_library | array <MPEG_haptics_effect> | N/A | List of predefined MPEG_haptics.effect as defined in a subclause. The list may be empty. Library effects are referenced directly in the channels. | Yes |
| effect_semantic | string | urn:mpegi:haptics:effect-semantic:2023 | The scheme used for the semantic description of effects. | No |
| reference_devices | array <MPEG_haptics.reference_devices> | N/A | List of targeted MPEG_haptics_reference.device devices or actuators as defined in a subclause for this haptic perception. | No |
| channels | array <MPEG_haptics.channel> | N/A | List of targeted MPEG_haptics_channel composing this perception. | Yes |

TABLE 3-continued

Description of the MPEG_haptics.perception object

| Property | Type | Default | Description | Required |
|---|---|---|---|---|
| unit_exponent | integer | −3 | Refers to the exponent of the power of 10 for he SI unit identifying the space of representation of the independent variable (cf. as in a subclause for each input unit) | No |
| perception_unit_exponent | integer | 0 | Refers to the exponent of the power of 10 for the SI unit measure of the dependent variable (cf. as in a subclause for each output perception unit) | No |

As shown in Table 3, the item effect_semantic signals the used schemes for describing the effects scheme. The default scheme is the MPEG haptics specified scheme according to embodiments.

Further, additional solutions according to embodiments herein relate to adding a scheme identifier to MIHS. For example, embodiments herein add a semantic scheme identifier in MIHS as shown below in Table 4 as to a syntax of readMetadataPerception( ):

TABLE 4

Syntax of readMetadataPerception( )

| Syntax | No. of bits | Mnemonic |
|---|---|---|
| readMetadataPerception( ) { | | |
|   id; | 8 | uimsbf |
|   descriptionLength; | 8 | uimsbf |
|   description; | descriptionLength*8 | vlcs8 |
|   perceptionModality; | 8 | uimsbf |
|   avatarID; | 8 | uimsbf |
|   effectLibraryCount; | 16 | uimsbf |
|   effectSemantics; | 1 | boolean |
|   reserved; | 7 | |
|   if(effectSemantics){; | | |
|     schemeLength; | 8 | uimsbf |
|     for (i = 0; i < schemeLength; i++){ | | |
|       schemeCharacter; | 8 | uimsbf |
|     } | | |
|   } | | |
|   unitExponent; | 8 | uimsbf |
|   perceptionUnitExponent; | 8 | uimsbf |
|   referenceDeviceCount; | 8 | uimsbf |
|   for (i = 0; i < referenceDeviceCount; i++){ | | |
|     readReferenceDevice( ); | | |
|   } | | |
|   channelCount; | 8 | uimsbf |
| } | | |

TABLE 5

Syntax of readSemanticScheme( )

| Syntax | No. of bits | Mnemonic |
|---|---|---|
| readSemanticScheme( ) { | | |
|   schemeCharacter; | 8 | uimsbf |
|   descriptionLength; | 8 | uimsbf |
|   description; | descriptionLength*8 | vlcs8 |
|   perceptionModality; | 8 | uimsbf |
|   avatarID; | 8 | uimsbf |

TABLE 5-continued

Syntax of readSemanticScheme( )

| Syntax | No. of bits | Mnemonic |
|---|---|---|
| effectLibraryCount; | 16 | uimsbf |
| effectSemantics; | 1 | boolean |
| reserved; | 7 | |
| if(effectSemantics){; | | |
|   schemeLength; | 8 | uimsbf |
|   for (i = 0; i < schemeLength; i++){ | | |
|     schemeCharacter; | 8 | uimsbf |
|   } | | |
| } | | |
| unitExponent; | 8 | uimsbf |
| perceptionUnitExponent; | 8 | uimsbf |
| referenceDeviceCount; | 8 | uimsbf |
| for (i = 0; i < referenceDeviceCount; i++){ | | |
|   readReferenceDevice( ); | | |
| } | | |
| channelCount; | 8 | uimsbf |
| } | | |

As in Tables 4 and 5, parameters effectSemantics, SchemeLength, and schemeCharacter provide technical improvements. For example, effectSemantics is the flag for existing an effect scheme other than the one defined by a particular document (if this flag is 0, then the scheme of that document is used for signaling the effect semantics), and the schemeLength indicates a number of chars in the effect semantic scheme identifier string, and the schemeCharacter indicates on character in the effect semantic scheme identifier which is in the form of a URN (uniform resource name). The "schemeLength" may also be "schemeLength" according to embodiments herein.

As such, viewing at least Table 3-5 herein, there is thereby provided a method for signaling the scheme used for effect semantics in haptics interchange file format and haptics streaming format, wherein the scheme is signaled using an item at perception level using a URN, wherein in either case, the default one is a scheme defined by the MPEG haptic standards, while in other cases, the signaled scheme defines the semantic and the corresponding binary codes to be used in haptics interchange file and the haptics streaming format, respectively.

Further, embodiments herein also provide for single-layer keyword signaling. That is, there is defined, by embodiments herein, a flat dictionary that has various levels of semantics. But all semantic keywords get the same number of bits, e.g. 8 bits, according to embodiments. And then, the MIHS stream signals whether an effect has any semantic keyword, and if it does, how many keywords are included in the effect. See Table 6 as an example thereof:

TABLE 6

Syntax of readEffect( )

| Syntax | No. of bits | Mnemonic |
|---|---|---|
| readEffect( ){ | | |
|   id; | 16 | uimsbf |
|   effectType; | 2 | uimsbf |
|   effectPosition; | 25 | imsbf |
|   hasSemantic | 2 | uimsbf |
|   if(hasSemantic == 1){ | | |
|     effectSemantic | 8 | uimsbf |
|   } | | |
|   if(hasSemantic == 2){ | | |
|     effectSemantic | 8 | uimsbf |
|     effectSemantic | 8 | uimsbf |

TABLE 6-continued

Syntax of readEffect( )

| Syntax | No. of bits | Mnemonic |
|---|---|---|
|   } | | |
|   if(hasSemantic == 3){ | | |
|     semanticNumber | 4 | uimsbf |
|     for (i = 0; i < numbersemantic; i++){ | | |
|       effectSemantic; | 8 | uimsbf |
|     } | | |
|   } | | |
|   if (effectType == 0){ | | |
|     readEffectBasis( ); | | |
|   } | | |
| } | | |

Parameter hasSemantics is a flag signaling whether this effect has semantics according to Table 7:

TABLE 7 value of hasSemantics

| Value | Meaning |
|---|---|
| 0 | No semantics |
| 1 | One semantic keyword |
| 2 | Two semantic keywords |
| 3 | More than two semantic keywords |

Further, parameter semanticNumber indicates the number of semantic keywords for this effect, and this value shall be larger than 2. Also, the parameter effectSemantic indicates the semantic keyword code according to the semantic code table.

Embodiments herein also provide a 2-layer keyword signaling such that there is hereby defined a two-level dictionary of semantics where layer 1 defines a semantic for the general class and layer 2 defines a more specific semantic keyword in that class. A design of such embodiment is shown below in Table 8:

TABLE 8

Syntax of readEffect( )

| Syntax | No. of bits | Mnemonic |
|---|---|---|
| readEffect( ){ | | |
|   id; | 16 | uimsbf |
|   effectType; | 2 | uimsbf |
|   effectPosition; | 25 | imsbf |
|   hasSemantic | 2 | uimsbf |
|   if(hasSemantic == 1){ | | |
|     effectSemanticLayer 1 | 4 | uimsbf |
|     effectSemanticLayer 2 | 8 | uimsbf |
|   } | | |
|   if(hasSemantic == 2){ | | |
|     effectSemanticLayer1 | 4 | uimsbf |
|     effectSemanticLayer 21 | 8 | uimsbf |
|     effectSemanticLayer 22 | 8 | uimsbf |
|   } | | |
|   if(hasSemantic == 3){ | | |
|     semanticNumber | 4 | uimsbf |
|     for (i = 0; i < numbersemantic; i++){ | | |
|       effectSemanticLayer1; | 4 | uimsbf |
|       effectSemanticLayer2; | 8 | uimsbf |
|     } | | |
|   } | | |
|   if (effectType == 0){ | | |
|     readEffectBasis( ); | | |
|   } | | |
| } | | |

In Table 8, the parameter hasSemantics represents the flag signaling whether this effect has semantics according to the Table 9 below:

TABLE 9 value of hasSemantics

| Value | Meaning |
|---|---|
| 0 | No semantics |
| 1 | One layer 1 and one layer 2 semantic keyword |
| 2 | One layer 1 and one layer 2 semantic keywords |
| 3 | Multiple layer 1 and layer 2 semantics |

Also, according to Table 8, the parameter semanticNumber represents the number of semantic keywords for this effect, and, according to embodiments, this value shall be larger than 1. Also, according to Table 8, the parameter effectSemanticLayer1 represents the semantic keyword layer 1 code according to the semantic code table. Also, according to Table 8, each of effectSemanticLayer 2, effectSemanticLayer21, and effectSemanticLayer 22 represents the semantic keyword layer 2 code according to the semantic code table. Or also, according to Table 8, each of effectSemanticLayer 2, effectSemanticLayer21, and effectSemanticLayer 21 or effectSemanticLayer 22 represents the semantic keyword layer 1 or 2 code according to the semantic code table.

As such, there is provided herein a method for signaling the semantic keywords of a haptics effect in MIHS binary format, wherein in one case, simple flat signaling of the keywords is provided, wherein 4 different options are explicitly signaled: 1) no semantics, 2) one semantic keyword, 3) two semantic keywords and 4) three or more semantic keywords, and in the second case, a two-layer semantic keyword signaling is provided, wherein 4 different options are explicitly signaled: 1) no semantics, 2) one layer 1 and one layer 2 semantics, 3) one layer 1 and two layer 3 semantics, and 3) more than one layer 1 and/or two layer 2 semantics are signaled.

A person of skill in the art understands that the techniques described herein may be implemented on both the encoder side and the decoder side. The techniques, described above, can be implemented as computer software using computer-readable instructions and physically stored in one or more computer-readable media. For example, FIG. 10 shows a computer system 1000 suitable for implementing certain embodiments of the disclosure.

The computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 10:
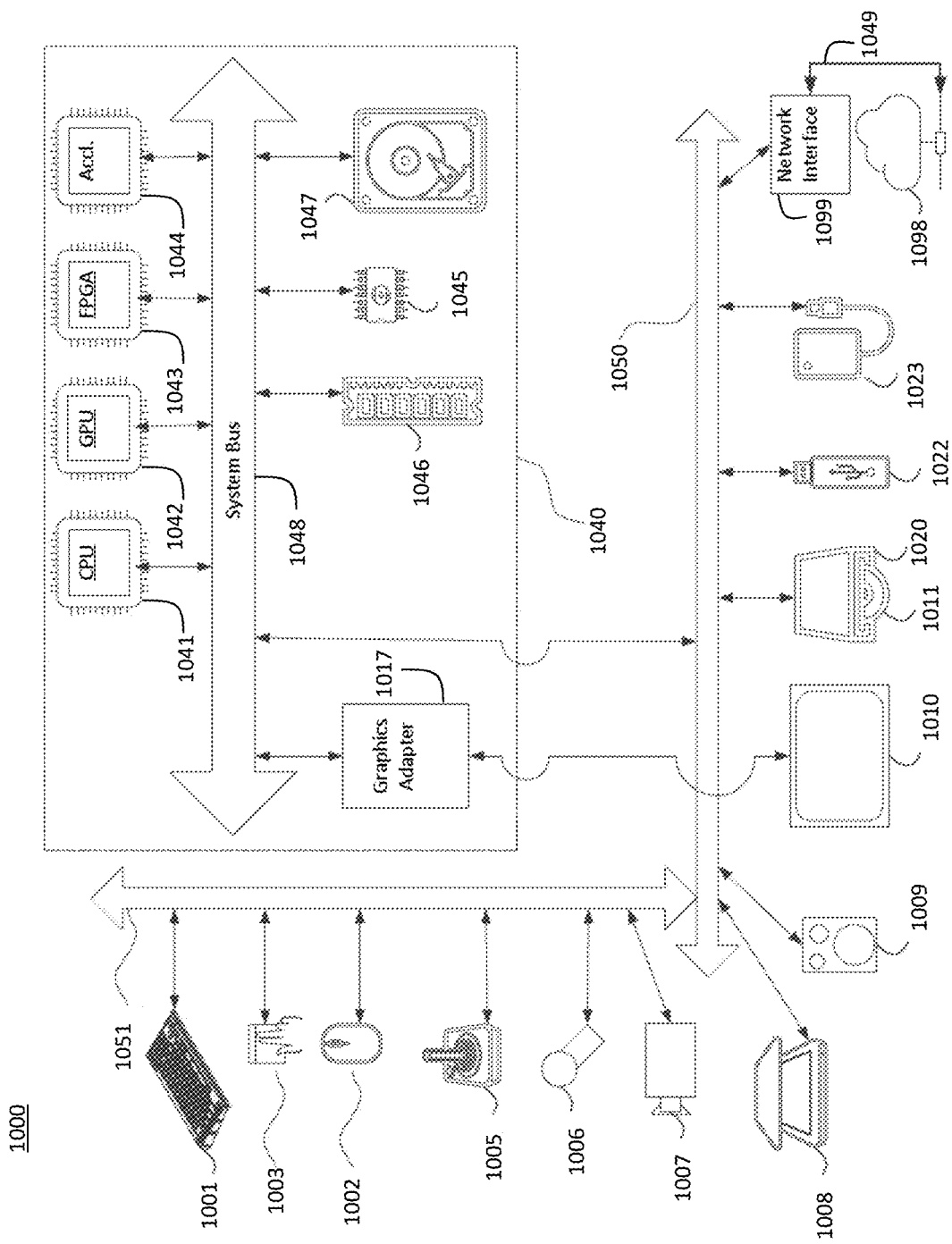
FIG. 10 is an exemplary diagram illustrating aspects in accordance with embodiments of the present disclosure.

The components shown in FIG. 10 for computer system 1000 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 1000.

Computer system 1000 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1001, mouse 1002, trackpad 1003, touch screen 1010, data-glove, joystick 1005, microphone 1006, scanner 1007, camera 1008.

Computer system 1000 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1010, data glove, or joystick 1005, but there can also be tactile feedback devices that do not serve as input devices). For example, such devices may be audio output devices (such as: speakers 1009, headphones (not depicted)), visual output devices (such as screens 1010 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 1000 can also include human accessible storage devices and their associated media such as optical media including CD/DVD ROM/RW 1020 with CD/DVD or the like media 1021, thumb-drive 1022, removable hard drive or solid state drive 1023, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1000 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 1049 (such as, for example USB ports of the computer system 1000; others are commonly integrated into the core of the computer system 1000 by attachment to a system bus as described below (for example Ethernet interface into a PC computer system or cellular network interface into a smartphone computer system). Using any of these networks, computer system 1000 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 1055. Certain protocols and protocol stacks can be used on each of those networks and network interfaces as described above.

Aforementioned human interface devices, human-accessible storage devices, and network interfaces 1054 can be attached to a core 1040 of the computer system 1000.

The core 1040 can include one or more Central Processing Units (CPU) 1041, Graphics Processing Units (GPU) 1042, specialized programmable processing units in the form of Field Programmable Gate Areas (FPGA) 1043, hardware accelerators for certain tasks 1044, and so forth. These devices, along with Read-only memory (ROM) 1045, Random-access memory 1046, internal mass storage such as internal non-user accessible hard drives, SSDs, and the like 1047, may be connected through a system bus 1048. In some computer systems, the system bus 1048 can be accessible in the form of one or more physical plugs to enable extensions by additional CPUs, GPU, and the like. The peripheral devices can be attached either directly to the core's system bus 1048, or through a peripheral bus 1049. Architectures for a peripheral bus include PCI, USB, and the like. A graphics adapter 1050 may be included in the core 1040.

CPUs 1041, GPUs 1042, FPGAs 1043, and accelerators 1044 can execute certain instructions that, in combination, can make up the aforementioned computer code. That computer code can be stored in ROM 1045 or RAM 1046. Transitional data can be also be stored in RAM 1046, whereas permanent data can be stored for example, in the internal mass storage 1047. Fast storage and retrieve to any of the memory devices can be enabled through the use of cache memory, that can be closely associated with one or more CPU 1041, GPU 1042, mass storage 1047, ROM 1045, RAM 1046, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, a computer system having the architecture of computer system 1000, and specifically the core 1040 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1040 that are of non-transitory nature, such as core-internal mass storage 1047 or ROM 1045. The software implementing various embodiments of the present disclosure can be stored in such devices and executed by core 1040. A computer-readable medium can include one or more memory devices or chips, according to particular needs. The software can cause the core 1040 and specifically the processors therein (including CPU, GPU, FPGA, and the like) to execute particular processes or particular parts of particular processes described herein, including defining data structures stored in RAM 1046 and modifying such data structures according to the processes defined by the software. In addition or as an alternative, the computer system can provide functionality as a result of logic hardwired or otherwise embodied in a circuit (for example: accelerator 1044), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for decoding video data, the method being performed by at least one processor, the method comprising:
   receiving a media stream comprising data in one of a haptics interchange format and a haptics streaming format;
   in a case that the data is in the haptics interchange format, obtaining a first variable, from the media stream, and determining, from the first variable, a scheme used for a semantic description of effects of the media stream;
   in a case that the data is in the haptics streaming format, obtaining a second variable, from the media stream, and determining, from the second variable, the scheme used for a semantic description of effects of the media stream and a number of characters in the scheme, the second variable indicates "readMetadataPerception( )", and in the case that the data is in the haptics streaming format, the scheme is indicated in "readMetadataPerception( )" by an "effectSemantic" variable, and the number of characters in the scheme is indicated in "readMetadataPerception( )" by a "schemeLength" variable; and controlling decoding of the media stream based on determining the scheme.

2. The method according to claim 1, wherein the first variable indicates "MPEG_haptics.perception object".

3. The method according to claim 2, wherein in the case that the data is in the haptics interchange format, the scheme is indicated in "MPEG_haptics.perception object" by an "effect_semantic" variable.

4. The method according to claim 1, wherein "readMetadataPerception( )" further indicates that at least one character in an effect semantic scheme identifier is in the form of a uniform resource name (URN).

5. The method according to claim 1, wherein in the case that the data is in the haptics streaming format, the media stream indicates whether an effect has any semantic keyword and indicates how many keywords are included in the effect.

6. The method according to claim 5, wherein in the case that the data is in the haptics streaming format, the media stream indicates whether the effect has any semantic keyword by a "hasSemantics" variable.

7. The method according to claim 6, wherein in the case that the data is in the haptics streaming format, the media stream indicates how many keywords are included in the effect by a "semanticNumber" variable.

8. The method according to claim 7, wherein in the case that the data is in the haptics streaming format, the media stream further indicates, by an "effectSemantic" variable, a semantic keyword code according to a semantic code table.

9. A method for encoding video data, the method comprising:

receiving video data indicating one of a haptics interchange format and a haptics streaming format;

in a case that the data is in the haptics interchange format, obtaining a first variable, and determining, from the first variable, a scheme used for a semantic description of effects of the video data;

in a case that the data is in the haptics streaming format, obtaining a second variable, and determining, from the second variable, the scheme used for a semantic description of effects of the video data and a number of characters in the scheme, the second variable indicates "readMetadataPerception( )", and in the case that the data is in the haptics streaming format, the scheme is indicated in "readMetadataPerception( )" by an "effectSemantic" variable, and the number of characters in the scheme is indicated in "readMetadataPerception( )" by a "schemeLength" variable; and controlling encoding of the video data based on determining the scheme.

10. The method according to claim 9, wherein the first variable indicates "MPEG_haptics.perception object", and in the case that the data is in the haptics interchange format, the scheme is indicated in "MPEG_haptics.perception object" by an "effect_semantic" variable.

11. The method according to claim 9, wherein "readMetadataPerception( )" further indicates that at least one character in an effect semantic scheme identifier is in the form of a uniform resource name (URN).

12. The method according to claim 9, wherein in the case that the data is in the haptics streaming format, the video data indicates whether an effect has any semantic keyword and indicates how many keywords are included in the effect.

13. The method according to claim 12, wherein in the case that the data is in the haptics streaming format, the video data indicates whether the effect has any semantic keyword by a "hasSemantics" variable.

14. A method of storing a video bitstream into a non-transitory computer-readable storage medium, wherein the video bitstream is generated by a video encoding method comprising:

receiving video data indicating one of a haptics interchange format and a haptics streaming format;

in a case that the data is in the haptics interchange format, obtaining a first variable, and determining, from the first variable, a scheme used for a semantic description of effects of the video data;

in a case that the data is in the haptics streaming format, obtaining a second variable, and determining, from the second variable, the scheme used for a semantic description of effects of the video data and a number of characters in the scheme, the second variable indicates "readMetadataPerception( )", and in the case that the data is in the haptics streaming format, the scheme is indicated in "readMetadataPerception( )" by an "effectSemantic" variable, and the number of characters in the scheme is indicated in "readMetadataPerception( )" by a "schemeLength" variable; and controlling encoding of the video data based on determining the scheme.

15. The method according to claim 14, wherein the first variable indicates "MPEG_haptics.perception object", and in the case that the data is in the haptics interchange format, the scheme is indicated in "MPEG_haptics.perception object" by an "effect semantic" variable.

16. The method according to claim 14, wherein "readMetadataPerception( )" further indicates that at least one character in an effect semantic scheme identifier is in the form of a uniform resource name (URN).

17. The method according to claim 14, wherein in the case that the data is in the haptics streaming format, the video data indicates whether an effect has any semantic keyword and indicates how many keywords are included in the effect.

18. The method according to claim 17, wherein in the case that the data is in the haptics streaming format, the video data indicates whether the effect has any semantic keyword by a "hasSemantics" variable.

* * * * *